US008046839B2

(12) United States Patent
Lo

(10) Patent No.: US 8,046,839 B2
(45) Date of Patent: Oct. 25, 2011

(54) MOBILE UNIT PARENTAL CONTROL

(75) Inventor: Charles N. Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 828 days.

(21) Appl. No.: 12/101,370

(22) Filed: Apr. 11, 2008

(65) Prior Publication Data
US 2008/0256641 A1 Oct. 16, 2008

Related U.S. Application Data

(60) Provisional application No. 60/911,583, filed on Apr. 13, 2007.

(51) Int. Cl.
*G06F 17/30* (2006.01)
(52) U.S. Cl. ............................................. 726/26; 726/28
(58) Field of Classification Search .................... 726/21, 726/22, 28, 26; 713/154, 155, 166, 156; 380/277, 229, 232
See application file for complete search history.

(56) References Cited

U.S. PATENT DOCUMENTS

| 6,658,415 B1 * | 12/2003 | Brown et al. ..................... 1/1 |
| 6,678,733 B1 * | 1/2004 | Brown et al. ................ 709/229 |
| 7,100,053 B1 | 8/2006 | Brown et al. |
| 7,103,663 B2 * | 9/2006 | Inoue et al. .................... 709/225 |
| 7,124,938 B1 * | 10/2006 | Marsh ............................ 235/382 |
| 7,437,772 B1 * | 10/2008 | Thenthiruperai et al. ....... 726/30 |
| 7,606,883 B1 * | 10/2009 | Allibhoy et al. .............. 709/223 |
| 7,818,789 B2 * | 10/2010 | Beilinson et al. ................. 726/4 |
| 7,836,192 B2 * | 11/2010 | Johnson et al. .............. 709/229 |
| 2006/0136964 A1 | 6/2006 | Diez et al. |
| 2006/0259642 A1 | 11/2006 | Du et al. |
| 2007/0274526 A1 * | 11/2007 | Wang et al. ................... 380/277 |
| 2008/0040666 A1 * | 2/2008 | Wang et al. ................... 715/526 |

OTHER PUBLICATIONS

International Search Report, PCT/US08/060270, International Search Authority, European Patent Office, Oct. 7, 2008.
Written Opinion, PCT/US08/060270, International Search Authority, European Patent Office. Oct. 7, 2008.

* cited by examiner

*Primary Examiner* — Krisna Lim
(74) *Attorney, Agent, or Firm* — Howard H. Seo; Won Tae Kim

(57) ABSTRACT

Parents can desire to limit content viewable upon a mobile device and a universal integrated circuit card can be programmed to limit viewing upon the mobile device. A user completes a service request form that includes an allowable view threshold for content upon the mobile device. The request can transfer to a service provider, sometimes via a base station. A subscription manager can forward the threshold back to the mobile device and the mobile device can program the threshold upon secure storage. When content is received, it can be compared against the threshold and a determination can be made on if the content is allowable to view in light of the threshold.

46 Claims, 16 Drawing Sheets

MOBILE UNIT PARENTAL CONTROL

CROSS-REFERENCE

This application claims priority off U.S. Provisional Application No. 60/911,583 entitled "SERVICE PROVISIONING OF PARENTAL CONTROL IN MOBILE TV", which was filed on Apr. 13, 2007. The entirety of which is herein incorporated by reference.

BACKGROUND

I. Field

The following description relates generally to wireless communications and, more particularly, to programming a chip card to regulate content viewing upon a mobile device.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with managing content viewing upon a mobile device. According to an aspect, a method is disclosed for managing content viewing upon a mobile device. The method can comprise comparing a rating of content against a threshold retained upon secure storage as well as formulating if the content can be viewed based upon a result of the comparison between the content rating and the retained threshold.

Another aspect relates to an apparatus that operates in a wireless communication system. The apparatus can comprise at least one processor configured to compare a rating of content against a threshold retained upon secure storage and formulate if the content can be viewed based upon a result of the comparison between the content rating and the retained threshold. Additionally, the apparatus can comprise a memory coupled to the at least one processor.

In a further aspect, a wireless communications apparatus that facilitates viewing remote content on a mobile device is disclosed herein. The apparatus can comprise means for comparing a rating of content against a threshold retained upon secure storage as well as means for formulating if the content can be viewed based upon a result of the comparison between the content rating and the retained threshold.

Yet another aspect relates to a computer program product that can comprise a computer-readable medium. The computer-readable medium can comprise code for comparing a rating of content against a threshold retained upon secure storage and code for formulating if the content can be viewed based upon a result of the comparison between the content rating and the retained threshold.

According to an aspect, a method that facilitates programming upon secure storage a threshold to regulate content viewing is disclosed herein. The method can comprise reading the threshold from communication provided by an auxiliary entity and generating a command set for the secure storage to implement the read threshold, the generated command set is used to program the threshold upon the secure storage.

Another aspect relates to an apparatus that operates in a wireless communication system. The apparatus can comprise at least one processor configured to read a threshold from communication provided by an auxiliary entity, and a generate a command set for secure storage to implement the read threshold, the generated command set is used to program the threshold upon the secure storage. Moreover, the apparatus can comprise a memory couple to the at least one processor.

In a further aspect, a wireless communications apparatus that facilitates programming upon secure storage a threshold to regulate content viewing is disclosed herein. The apparatus can comprise means for reading the threshold from communication provided by an auxiliary entity as well as means for generating a command set for the secure storage to implement the read threshold, the generated command set is used to program the threshold upon the secure storage.

Yet another aspect relates to a computer program produce that can comprise a computer-readable medium. The medium can comprise code for reading the threshold from communication provided by an auxiliary entity and code for generating a command set for the secure storage to implement the read threshold, the generated command set is used to program the threshold upon the secure storage.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
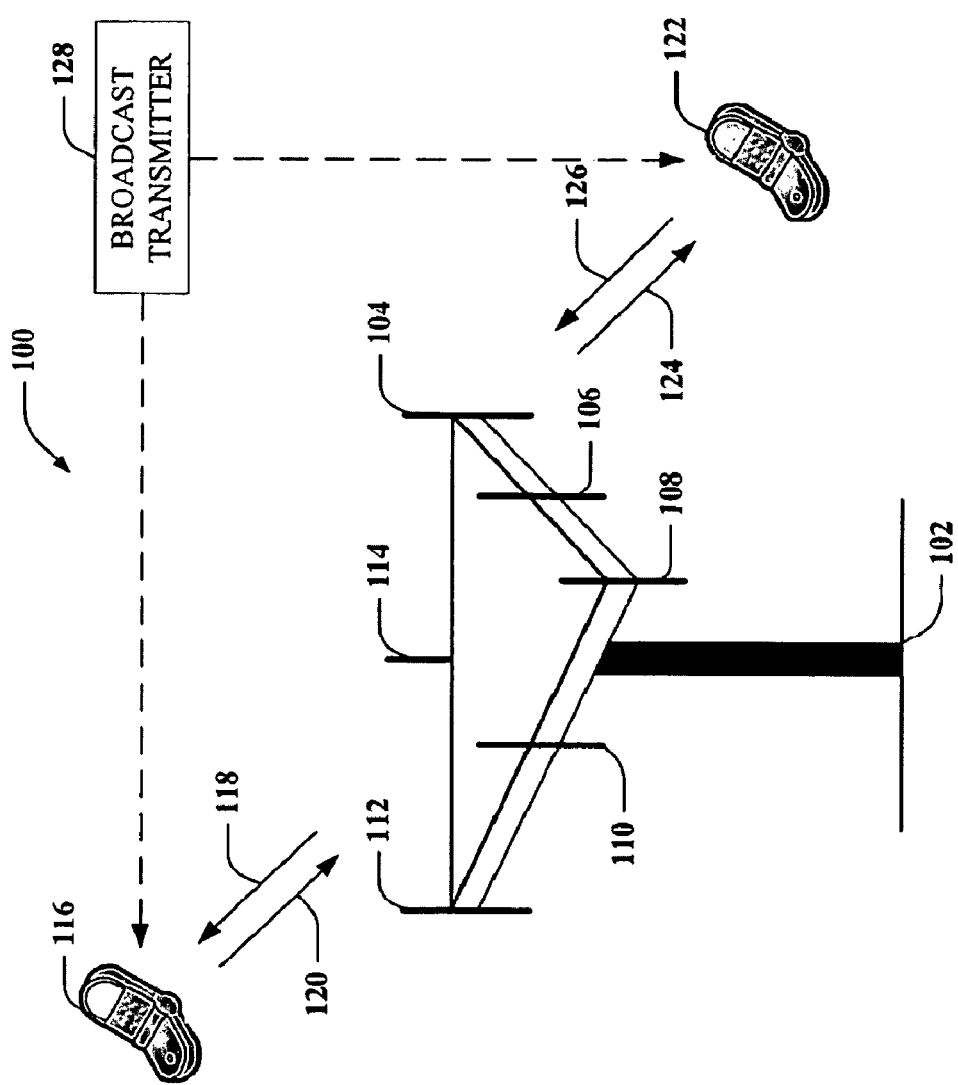
FIG. 1 is an illustration of a wireless communication system in accordance with various aspects set forth herein.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point. Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance, with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

FIG. 1 discloses a cellular system with a base station that enables bi-directional communication. However, in an alternate embodiment, a distribution system can be used where there is single directional communication. A broadcast transmitter emits data to a terminal and does not receive anything on a reverse channel. The mobile devices, 116 and 122 can send uplink information via the cellular base station 102 and a network sends a message from a tower and/or transmitter for distribution. A hybrid system can also be used, such as having the broadcast transmitter 128 emit information, while enabling the base station 102 to perform interaction as well as having the broadcast transmitter as a broadcast tower that implements a unidirectional push of information to mobile devices 116 and 122.

Figure 2:
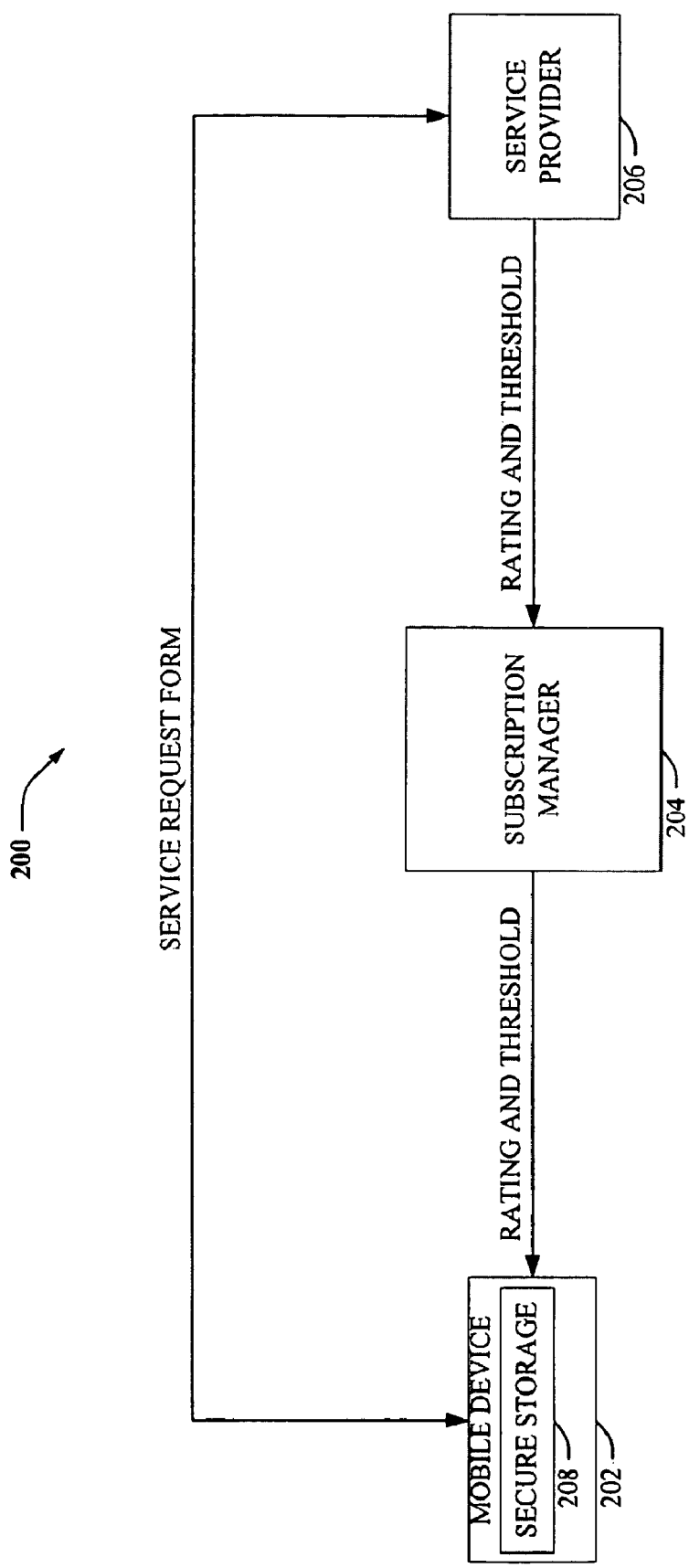
FIG. 2 is an illustration of an example communication system for transferring information in relation to viewing content upon a mobile device.

Now referring to FIG. 2, an example system 200 is disclosed for facilitating content viewing regulation upon a mobile device 202. A parent obtain the mobile device 202 and desire to order content for a child to view upon the mobile device 202. However, the parent can also desire that content be limited, such that material not suitable for the child is blocked. A service request form can be downloaded via a subscription manager 204 or directly from a service provider 206 (e.g., a host that provides movies to a user for a fee) at request of the parent. Such service provider has a subscription or purchasing based business relationship with the end user, and is often referred to in the literature as a "broadcast service provider". The parent can complete the request form by specifying what services she desires (e.g., a set number of movies, a month-long viewership, and the like) as well as what rating threshold she would like used in regulating content upon the mobile device 202 (e.g., block movies with a high violence rating, allow movies with a low violence rating, etc.). Note that the user interface for display and accepting user entry on the service request form is typically terminal implementation specific and is outside the scope of this invention.

The completed form can be returned to the service provider 206 (e.g., directly, via a base station, etc.) and the service provider 206 can supply content as well as metadata related to the content (e.g., service guide information), where the metadata can include a rating of the content, a critic score, running time, and the like. According to one embodiment, the content and/or a threshold can be transmitted to the mobile device 202 in a secured manner (e.g., as a short-term key message that can be subjected to an integrity check) while the metadata is relayed in a non-secure manner. The subscription manager 204 can analyze the threshold and create instructions for programming the threshold upon a secure storage 208 (e.g., a chip card such as a universal integrated circuit card, commonly referred to as a 'smartcard', or secure memory of the mobile device, i.e., a separate physical entity from a smartcard which may or may not exist) of the mobile device 202. While aspects disclosed herein discuss programming a chip card, it is to be appreciated that other forms of secure storage 208 can be used in implementing disclosed aspects.

In order to protect content in a secure manner, a network can include the subscription manager 204 and secure storage 208 that share a secret key. From the secret key, when a user states she wants to subscribe to content, a subscription key can be generated, where the subscription key is used to encrypt a service encryption key that can function as a long-term key. Then the service encryption key can be used to protect a traffic encryption key. The traffic encryption key is used to encrypt content. The mobile device 202 can use the subscription key to decrypt the service encryption key. The decrypted service encryption key can then be used to decrypt the traffic encryption key and thus the mobile device 202 has an ability to decrypt content.

The parental threshold can be sent as a payload of a specially defined key management message. A determination can be made if the content should be viewed based on comparing the rating against the threshold and appropriate action can be taken as a function of the comparison (e.g., content can be disclosed to the user, content can be blocked, portions of a program designated above the threshold can be filtered out, and the like).

Conventional content regulatory systems implement a threshold upon local unsecure storage of a mobile device. A user directly programs the threshold into mobile device local storage and the threshold is used in regulating content viewing. The subject disclosure goes against conventional practice—there can be programming a secure storage 208 as opposed to local storage and indirectly programming the secure storage 208. The secure storage 208 can be considered more secure than the local storage; however, it is commonly viewed as much more difficult to program and thus few in research circles consider using a chip card. Therefore, little development has taken place in the art with regard to using a secure storage 208 to regulate content viewing upon a mobile device 202. One in the art would find it illogical to use the chip card for programming the threshold when local storage can be more convenient.

Figure 3:
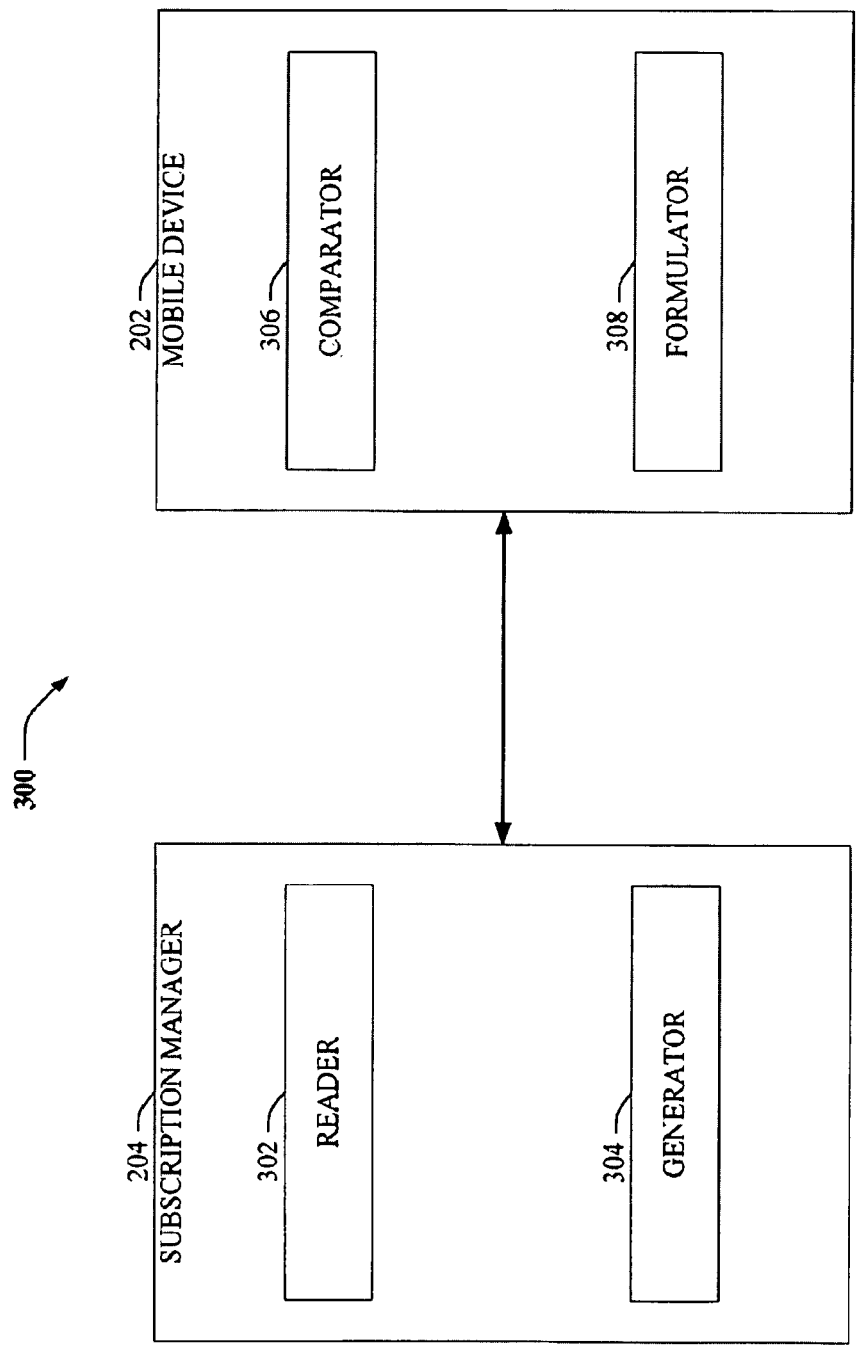
FIG. 3 is an illustration of an example mobile device and subscription manager configuration for programming a threshold rating upon the mobile device and/or regulating content upon the mobile device.

Now referring to FIG. 3, an example system 300 is disclosed for regulating content upon a mobile device 202 with a subscription manager 204. A user can provide a request form to a service provider with an appeal for content as well as a threshold that should regulate viewing of that content. While the provided request form can be transmitted from the mobile device 202, it is to be appreciated that other configurations are possible, such as sending the request form from a desktop computer to regulate the mobile device 202 as well as making arrangements through a call from the mobile device 202 to a customer service entity.

The service provider can relay the threshold to the subscription manager 204 through a wireless communication, where the base station interprets the threshold from the communication through a reader 302. Oftentimes, the communication from the service provider can be encrypted, and the reader 302 can decrypt the threshold from the communication. According to an alternative embodiment, the request form transfers through a base station prior to arrival to a service provider.

Based upon the identified threshold, a programming command set can be produced (e.g., created, selected, etc.) by a generator 304 that enables the secure storage 208 of FIG. 2 to be programmed with the threshold. Example command sets can include a signal notifying the mobile device 202 of the threshold, computer code to program a chip card, and the like. Different mobile devices 202 can have different chip cards and the generator 304 can develop specific instructions for the different chip cards. According to one embodiment, the generator 304 can retain a database of command sets, where a command set is selected by the generator 304 based upon the threshold and/or an anticipated chip card type. The mobile device can receive protected content encrypted by a short term key, and a content rating as part of a short-term key message. The short-term message also includes a short-term key that is encrypted by a long-term key, whereas the associated content rating is not encrypted. While not encrypted, the rating can still ensured to be genuine through an integrity check procedure.

The mobile device 202 can receive content as well as a rating for the content. A comparator 306 can balance the rating of the content against a programmed chip card threshold (e.g., a threshold that is programmed through a command set produced by the generator 304). Based upon the balance, a formulator 308 can determine if content should be viewed upon the mobile device 202.

For example, the system 300 can use a three tier rating system where 'child', 'teenager', or 'adult' are designated as available ratings. The command set can implement a threshold that limits viewership to content rated 'child' or 'teenager'—commonly the limitation applies to content of a service provider related to the completed form, but other implementations can be practiced. If content is received that is rated 'adult', then the comparator 306 can balance the threshold against the rating and the formulator 308 can determine that the content is too highly rated to be viewed upon the mobile device 202. In contrast, if the rating of the content is at 'child' or 'teenager', then the formulator 308 can determine that the mobile device 202 should allow the content to be disclosed.

Figure 4:
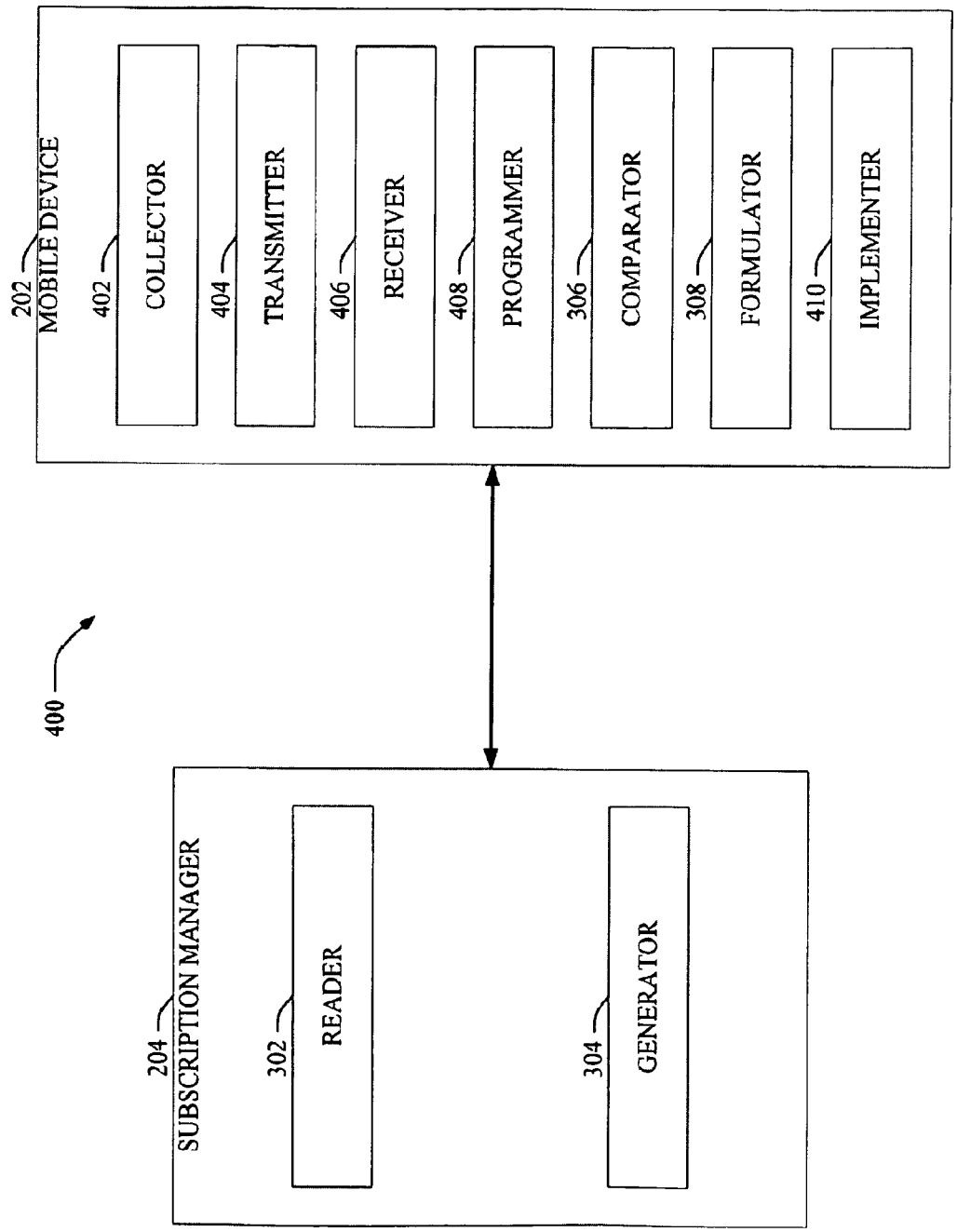
FIG. 4 is an illustration of an example detailed mobile device and subscription configuration for programming a threshold rating upon the mobile device and/or regulating content upon the detailed mobile device.

Now referring to FIG. 4, an example system 400 is disclosed for regulating content viewing with a subscription manager 204 and detailed mobile device 202. According to one embodiment, a user completes a form upon the mobile device 202 to set the threshold utilized by the generator 304. A collector 402 can gather a form from a broadcast service provider where the form commonly includes multiple fields such as price, duration, package, allowable content ratings, and the like. The user commonly enters information upon at least some of the fields via a user interface of the mobile device 202 where one of the completed fields is an allowable content rating that can be viewed upon the mobile device 202. While the gathered form can be supplied for a service provider, it is to be appreciated that other suppliers can be utilized (e.g., a third party host). The completed form (e.g., partially completed, hilly completed, . . . ) can be conveyed by a transmitter 404.

A service provider or the mobile device 202 can supply a threshold to the subscription manager 204, where the threshold is to be programmed upon a chip card of the mobile device 202. A reader 302 can interpret a threshold from communication provided by an auxiliary entity (e.g., service provider, mobile device 202, etc.). Based upon the interpreted threshold, a generator 304 can produce a command set for a chip card to implement the read threshold, the generated command set is used to program the threshold upon the chip card (e.g., the chip card resides upon the mobile device 202).

The mobile device 202 can include a receiver 406 that attains a command set for programming the chip card concerning the threshold (e.g., supplied from the generator 304). A programmer 408 can implement the command set such that the chip card is coded in accordance with the received command set. Implementing the command set can create a new threshold as well as overwrite an existing threshold (e.g., change threshold from 'teenager' to 'child'). According to one embodiment, a received threshold can be considered a global default—if another rating is not supplied for specific content, then a received threshold is globally used (e.g., a first-in-time received threshold, a last-in-time threshold, a most consistent threshold, and the like.)

Content can be received by the receiver 406 and a comparator 306 can balance a rating of content against the threshold retained upon a chip card. With the balance, a formulator 308 can determine if the content can be viewed based upon a result of the comparison between the content rating and the retained threshold. An implementer 410 can take action based upon the result—for example, the implementer 410 can allow the content to be viewed if the comparison is successful or deny the content to be viewed if the comparison is unsuccessful. Different standards can be used to determine if a comparison is successful (e.g., the content is at an acceptable rating for viewing). A successful comparison can occur in an instance that the content rating is equal to or lesser than the threshold; however a successful comparison can also occur in an instance that the content rating is lesser than the threshold. Additionally, other configurations can be practiced such as allowing a portion of the content to be viewed (e.g., most of a movie can be played that is rated at 'teenager', but violent scenes rated at 'adult' can be blocked such that the 'adult' scenes are removed and remaining scenes are streamlined together).

Figure 5:
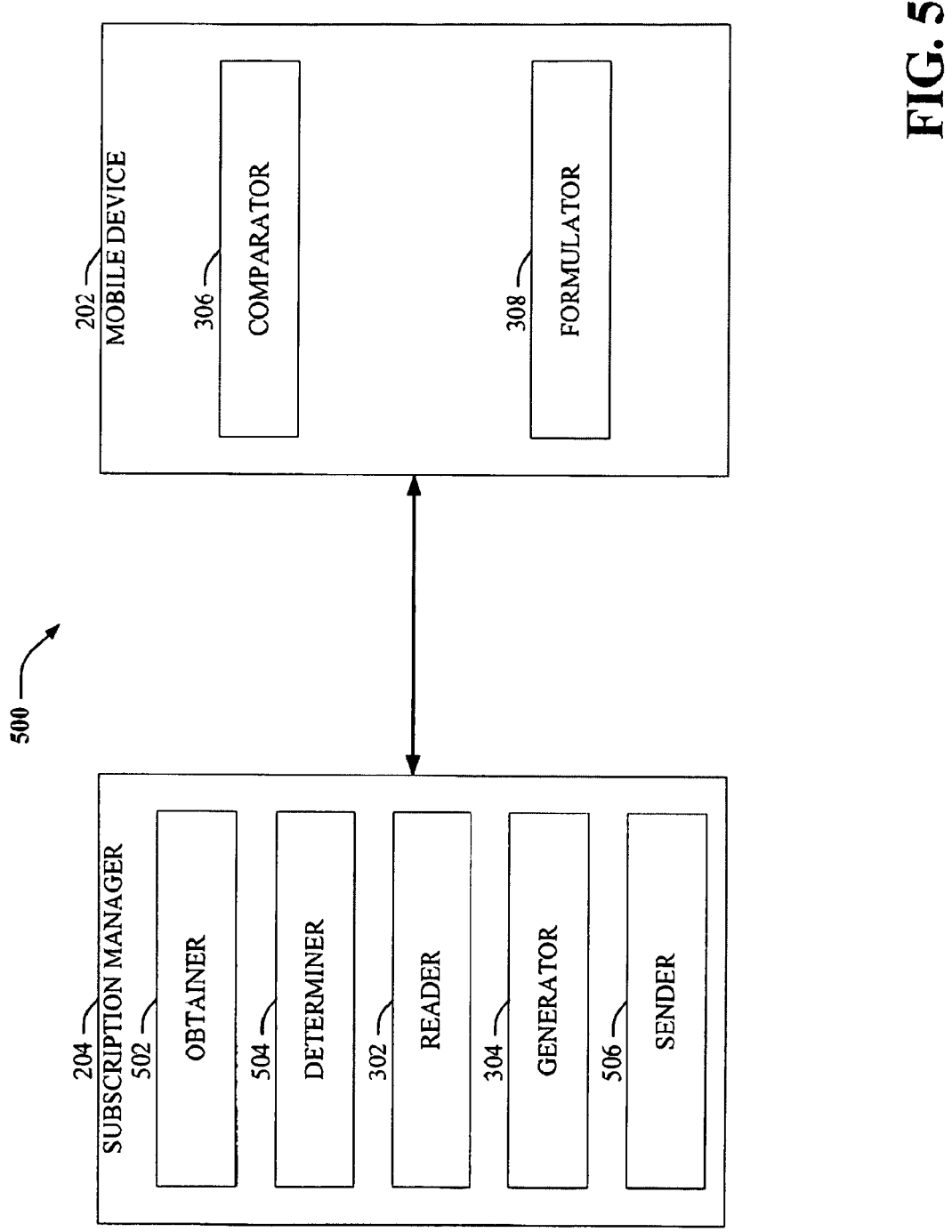
FIG. 5 is an illustration of an example mobile device and detailed subscription manager configuration for programming a threshold rating upon the mobile device and/or regulating content upon the mobile device.

Now referring to FIG. 5, an example system 500 is disclosed for regulating content viewing with a detailed subscription manager 204 and a mobile device 202. An auxiliary entity can transmit a communication that includes threshold for use in regulating content viewing upon the mobile device 202. An obtainer 502 can collect the communication and send a confirmation message to the auxiliary entity and/or the mobile device 202.

It is possible for the system 500 to implement in a multi-point environment, where there are multiple service providers, mobile devices, subscription managers, and/or base stations. Therefore, the subscription manager 204 can configure to handle relatively large amounts of traffic, such that the subscription manager 204 manages multiple communications with regard to multiple service providers and/or mobile devices. A determiner 504 can conclude a mobile device 202 that is to have a chip card programmed. For instance, multiple requests can be received for content to be streamed upon a mobile device 202, where the requests have different thresholds. The determiner 504 identifies a mobile device 202 that is to be programmed with a specific threshold.

In addition to identifying a party that is to have a chip card programmed, a reader 302 can interpret a threshold from communication provided by an auxiliary entity. With the interpretation, a generator 304 can produce a command set for a chip card to implement the read threshold, the generated command set is used to program the threshold upon the chip card. Specifically, the generator 304 can tailor the command set for a specific mobile device that can be ascertained from an output of the determiner 504. The command set can be integrated into a short-term key by a sender 506 that transmits the command set to the determined mobile device 202.

A command set can be collected and extracted by the mobile device 202, where the command set can be used to program a chip card of the mobile device 202. Content with a particular rating can be collected by the mobile device 202, where a comparator 306 can balance a rating of content against a threshold retained upon a chip card. A result of the balance can transfer to a formulator 308 that can determine if the content can be viewed based upon a result of the comparison between the content rating and the retained threshold.

Figure 6:
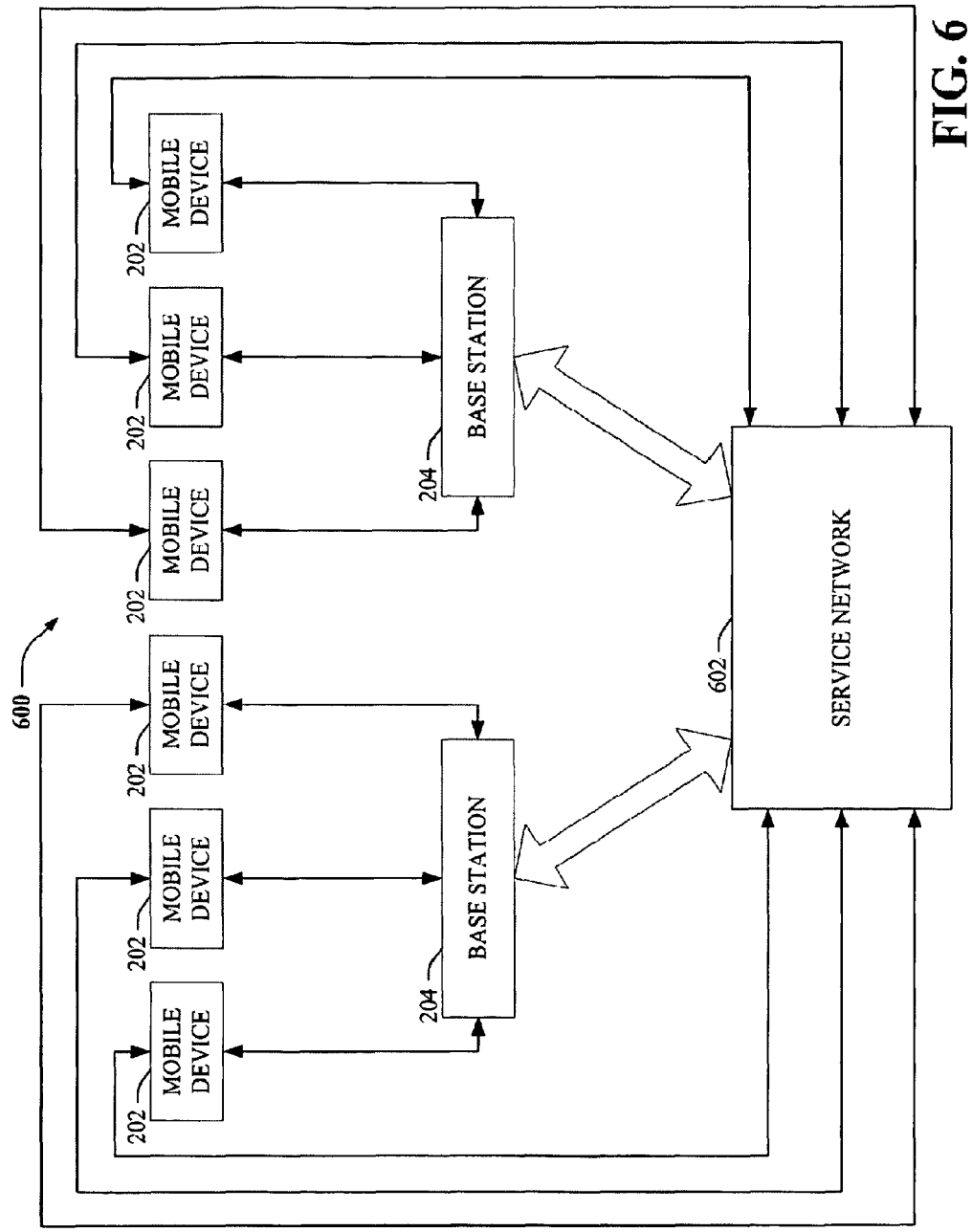
FIG. 6 is an illustration of an example multi-point communication system for transferring information in relation to viewing content upon a mobile device.

Now referring to FIG. 6, an example system 600 with multiple mobile devices 202 and base stations 204 in addition to a service network 602 that can include service providing and/or subscription management capabilities is disclosed. While aspects of the subject disclosure discuss communication between singular modules, it is to be appreciated that aspects can be practiced in a multi-point environment. A number of mobile devices 202 can transmit completed forms to a service provider that is part of a service network 602. As part of the transmission, the mobile devices 202 can include identification information that relates to the mobile device, such as a unique Internet Protocol address.

The service provider can process the completed forms and provide appropriate content, a threshold, identification information, and the like to a subscription manager that is also part of the service network 602. The threshold, content, content metadata, and the like can be relayed to different mobile devices 202 by multiple base stations 204. The command set, the content, and the like can transfer to the mobile device 202 and be implemented accordingly. In an alternate embodiment, the system 600 can implement with unidirectional units, where a tower transmits information from the mobile device 202 to the service network 602 and separate towers are used to transmit data from the service network 602 to the mobile devices 202.

Referring to FIGS. 7-11, methodologies relating to content regulation upon a mobile device are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 7:
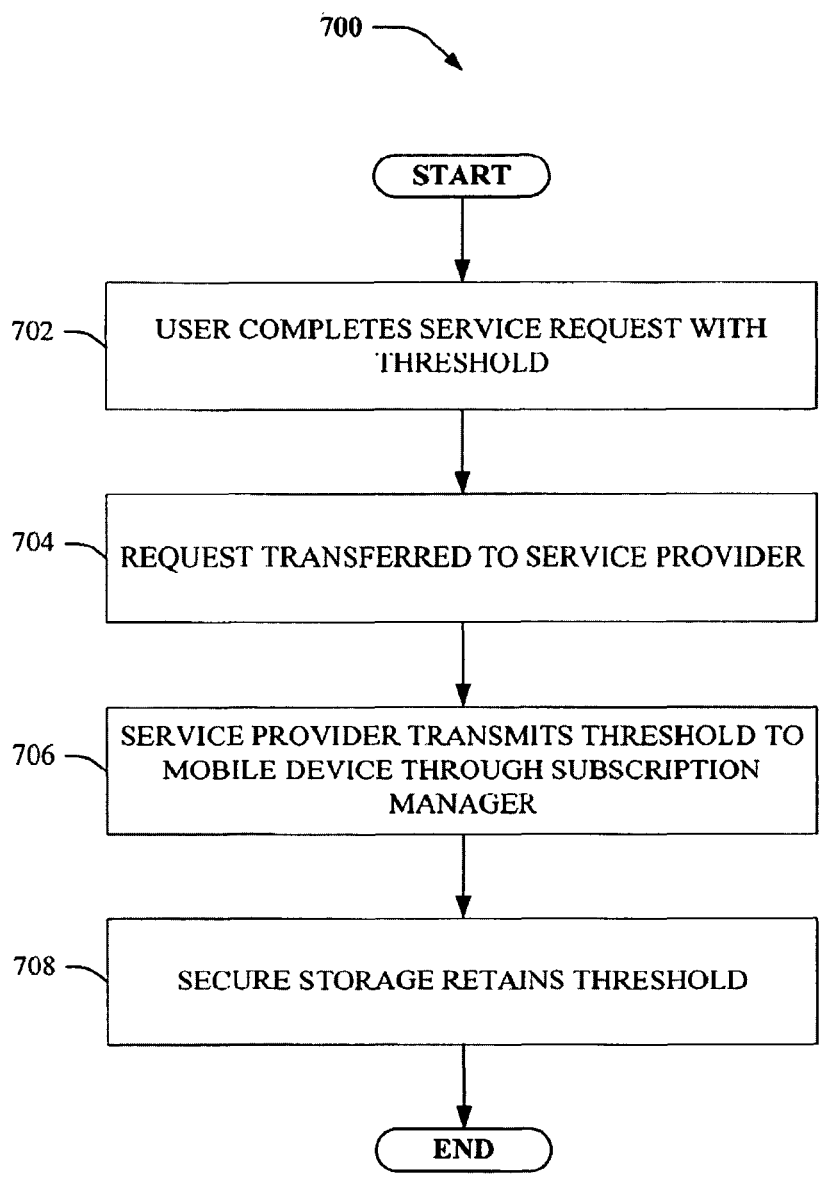
FIG. 7 is an illustration of an example methodology for communicating content viewable upon a mobile device.

Referring now to FIG. 7, an example methodology 700 is disclosed for regulating content upon a mobile device, commonly through utilization of a chip card. A user can complete a service request form at block 702, where completion of the form includes disclosing an intended content rating threshold. Additionally, a monetary transaction can take place, such that a service provider is compensated for presenting content (e.g., a movie, live sports, real time stock quotes, etc.) through use of a credit card account number provided on the form. The form that includes the anticipated threshold rating can be transmitted to the service provider at event 704. Since monetary information can be transmitted, such as financial account numbers, various protective features can be implemented to secure information.

The service provider can receive the transmitted form and perform operations consistent with supplying content, such as verifying an account and determining if a threshold is supplied in the form/a value of the threshold. At block 706, the service provider can transmit the threshold to a subscription manager and the subscription manager can send a command set (e.g., a threshold value) to a mobile device. The sent command set can be used to retain the threshold upon secure storage at event 708.

Figure 8:
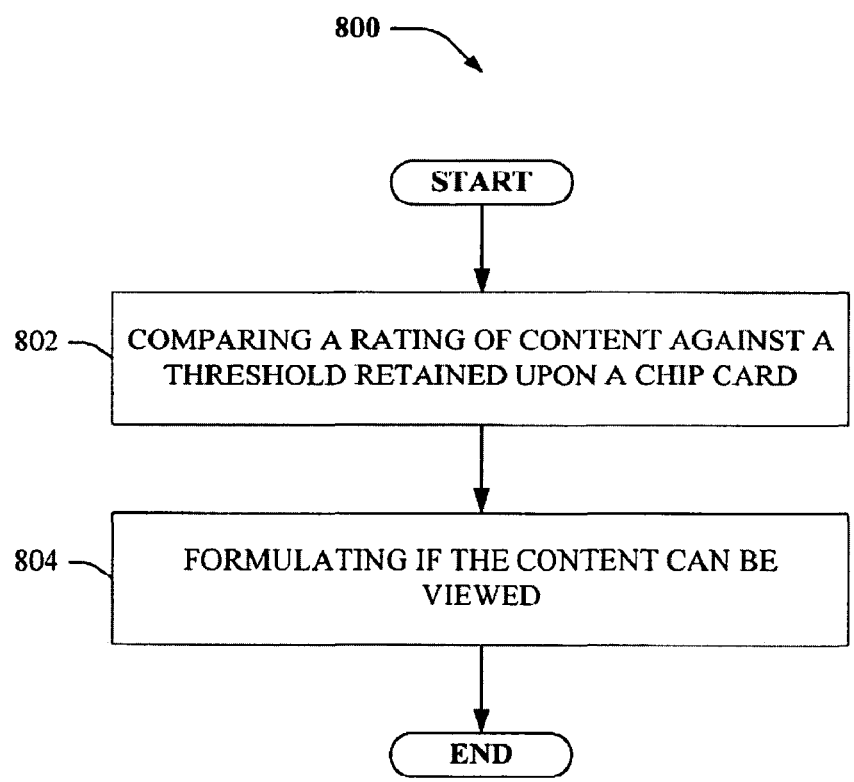
FIG. 8 is an illustration of an example methodology for regulating content viewing upon a mobile device.

Referring now to FIG. 8, an example methodology 800 is disclosed for regulating content viewing, commonly implemented upon a mobile device. Content that is to be viewed can include a rating that is compared against a set threshold at event 802. The threshold can be retained upon a chip card that is located upon the mobile device. Based upon a result of the comparison, a formulation can be made on if the content is defined as viewable at event 804.

According to one embodiment, complex ratings and thresholds can be used to determine if content is viewable. For example, a multi-tier rating system can be used in conjunction with a numerous factors. The multi-tier rating system can include 'child', 'teenager', and 'adult' while different factors can include violence, language, sexuality, etc. The threshold can be set at different ratings for different factors, such as violence being set to 'teenager' while language can be set to 'adult'. Appropriate comparisons can be made (e.g., comparing a content violence rating against a violence threshold) and the formulation can be determined based upon the comparison.

Figure 9:
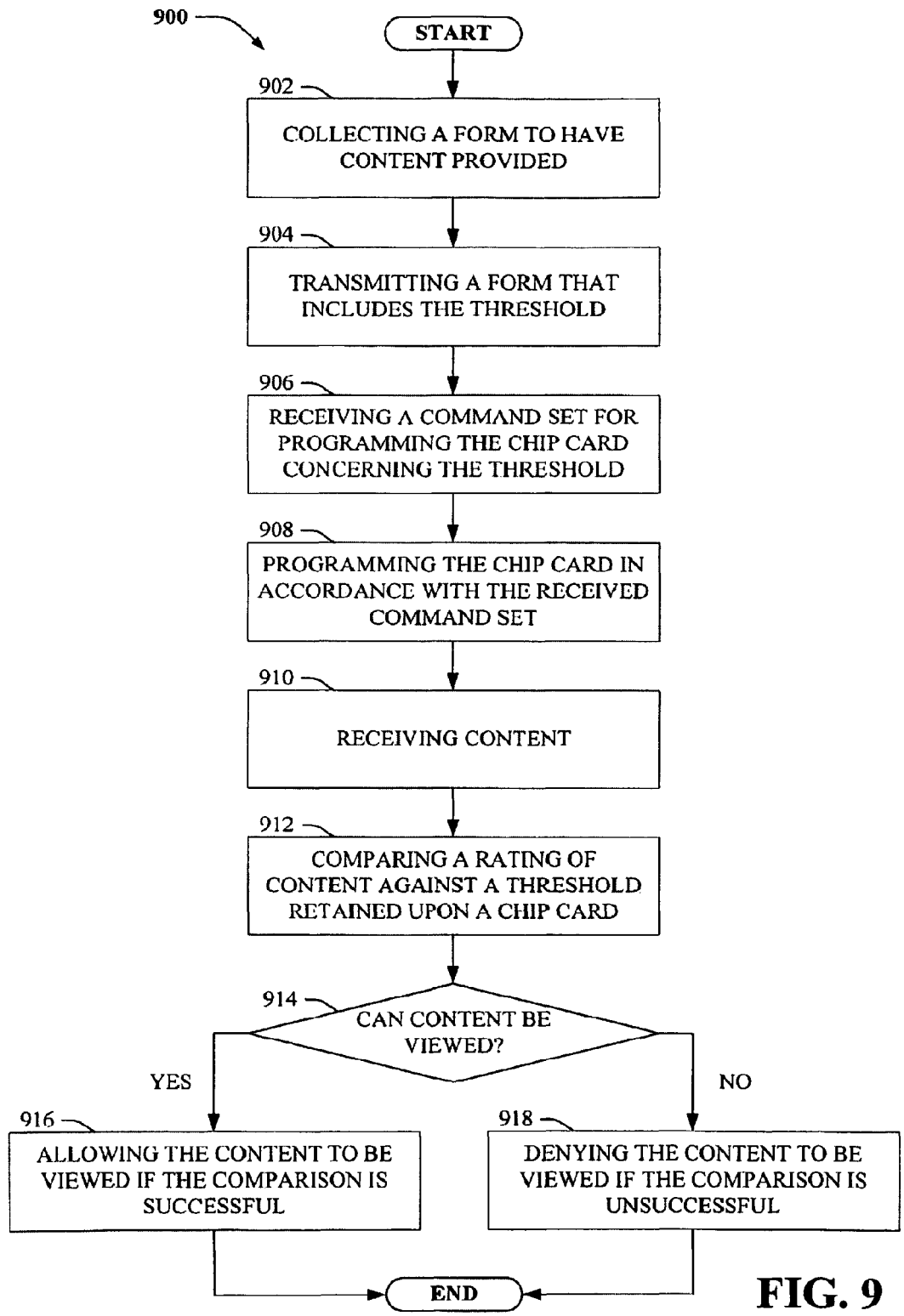
FIG. 9 is an illustration of an example detailed methodology for regulating content viewing upon a mobile device.

Referring now to FIG. 9, an example methodology 900 is disclosed for regulating content viewing, commonly implemented upon a mobile device. A form can be collected from a service provider that facilitates obtainment of a threshold at action 902. According to one embodiment, a user makes a request to a service provider for a form so the user can apply for content. The service provider can process the request and transfer the correct form, where the transferred form is collected.

The user can complete the form (e.g., add the threshold information) and then the form can be transmitted to the service provider at act 904. A determination can be made if the completed form includes sensitive information (e.g., a credit card number) and if the determination is positive, then the sensitive information and/or the entire form can be encrypted. Transmission of the form can be directly to the service provider, be relayed through the base station, and the like. Action 902 and/or act 904 can be completed through use of a mobile device, personal computer, and the like.

A command set that can be used to program a chip card can be received at action 906. The chip card can be programmed with the threshold in accordance with the received command set at event 908. The command set can be computer code that initiates the programming, a notice that the chip card should be programmed with the threshold, and the like.

The content can be then received at act 910, where the content commonly includes a rating. A comparison can be made between the threshold and the rating of the content at event 912. A check 914 can be made to determine if content can be viewed; the check 914 can function as formulating if the content can be viewed based upon a result of the comparison between the content rating and the retained threshold. If the comparison is considered successful, then an allowance to view the content can occur at event 916; if the comparison is considered unsuccessful, then denial to view the content can occur at action 918. A successful comparison can be that the content rating is equal to or lesser than the threshold, a successful comparison can that the content rating is lesser than the threshold, etc.

Figure 10:
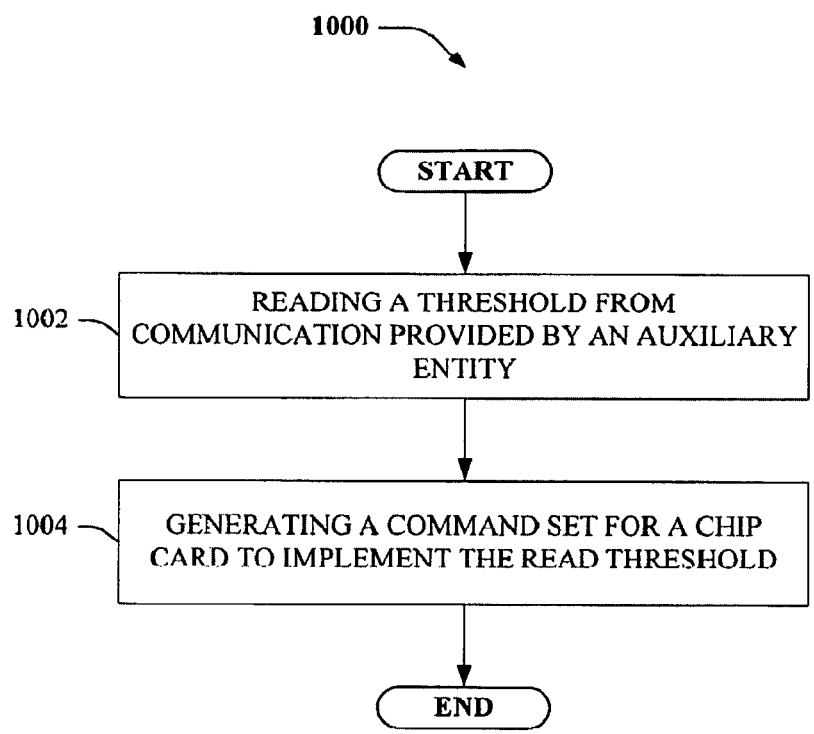
FIG. 10 is an illustration of an example methodology for generating a command set to program a threshold rating upon a chip card.

Referring now to FIG. 10, an example methodology 1000 is disclosed for producing a command set to program a threshold for regulating content viewing upon a chip card. A communication can be transmitted from an auxiliary entity, oftentimes from a content service provider, which includes the threshold. The threshold can be read from the communication at action 1002. Reading of the threshold can include decrypting the threshold, decompressing information that retains the threshold, and the like.

Based upon the read threshold, a command set can be generated that programs the chip chard with the threshold at event 1004. The command set can program a new threshold as well as overwrite an existing threshold upon the chip card. According to one embodiment, specific characteristics of a chip card can be ascertained and based upon the ascertained characteristics, the command set can be generated.

Figure 11:
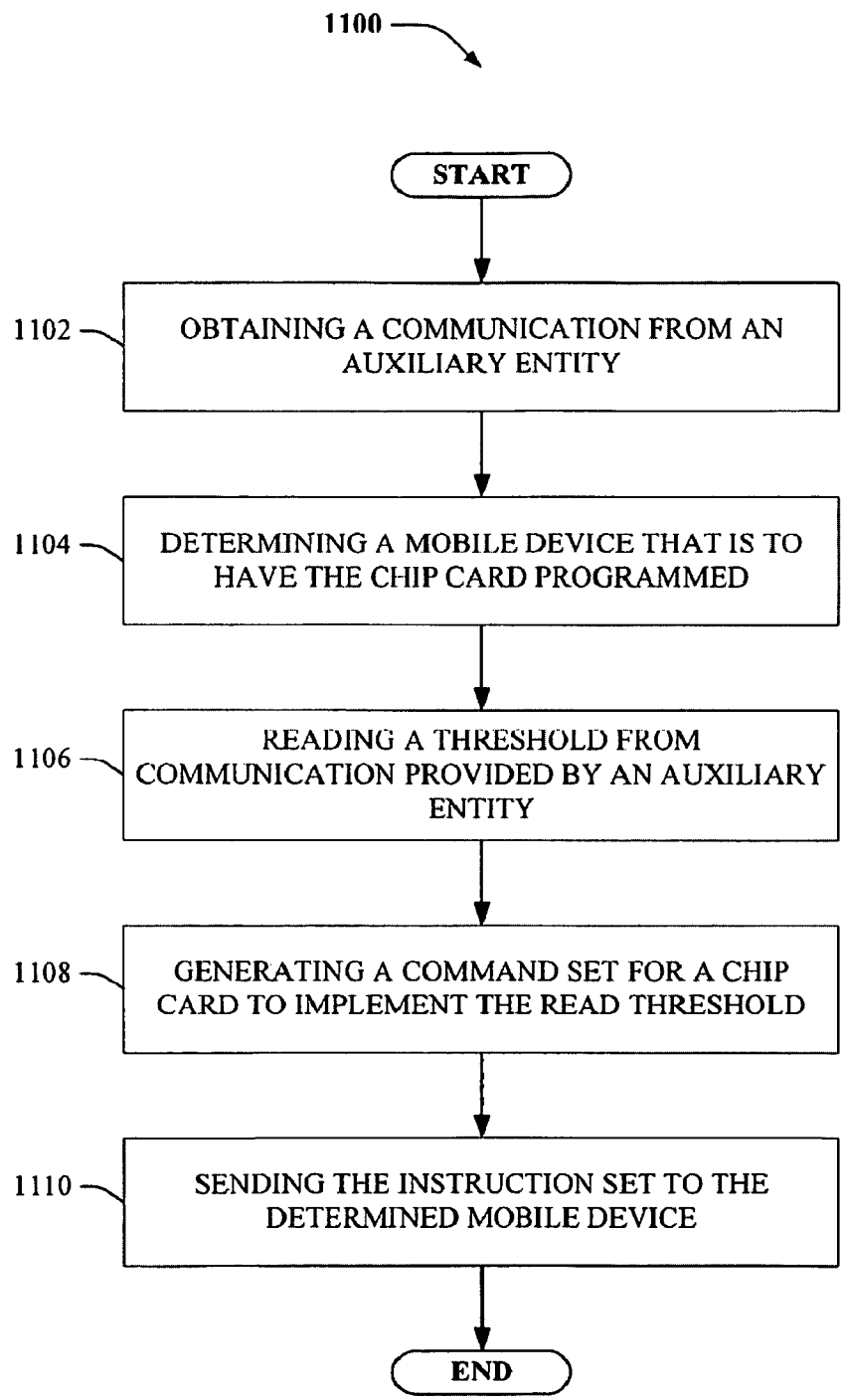
FIG. 11 is an illustration of an example detailed methodology for generating a command set to program a threshold rating upon a chip card.

Referring now to FIG. 11, an example detailed methodology 1100 is disclosed for producing a command set to program a threshold for regulating content viewing upon a chip card. A communication from an auxiliary entity can be obtained at action 1102, commonly from a service provider or from a mobile device that retains the chip card. Various security features can be implemented concerning communication obtainment, such as checking for errors in the communication, determining if the communication is from a reliable/correct source, and the like.

A determination can be made at act 1104 as to what mobile device is to have an obtained threshold programmed upon a chip card. A relatively large number of communications can be obtained, where the communications include different thresholds for different mobile devices. Therefore, making the determination assists in assuring that a threshold and/or an appropriate command set can transfer to a correct mobile device.

The threshold can be read from the communication at action 1106. Based upon the read threshold, a command set can be generated that programs the chip chard with the threshold at event 1108. The command set can transfer to the determined mobile device at act 1110. According to one embodiment, feedback can be collected, such as collecting information if the programming the chip card is successful, a manner the card chip is programmed, and the like.

It will be appreciated that, in accordance with one or more aspects described herein, inferences can be made regarding whether a semi-connected mode should be employed, determining a wakeup period parameter, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
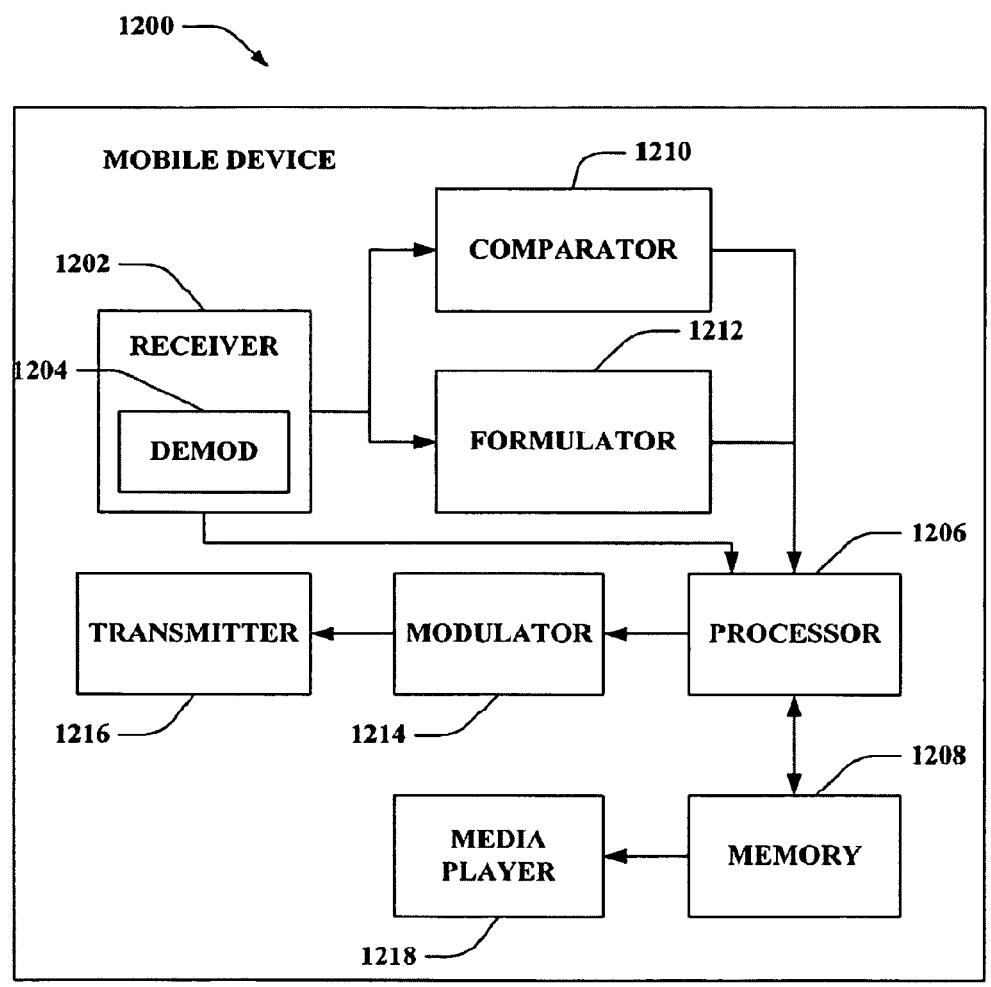
FIG. 12 is an illustration of an example mobile device that facilitates content viewing regulation.

FIG. 12 is an illustration of a mobile device 1200 capable of regulating content through a threshold retained upon a chip card. Mobile device 1200 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache, memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Processor 1202 is further operatively coupled to a comparator that contrasts a programmed threshold rating against a rating associated with content that is to be viewed upon the mobile device 1200. Additionally, the mobile device 1200 can include a formulator 1212 that determines if content can be viewed based upon a result of a comparison. Mobile device 1200 still further comprises a modulator 1214 and a transmitter 1216 that transmits a signal (e.g., base CQI and differential CQI) to, for instance, a base station, another mobile device, etc. Although depicted as being separate from the processor 1206, it is to be appreciated that semi-connected controller 1210 and/or modulator 1214 can be part of processor 1206 or a number of processors (not shown). Additionally, the mobile device 1200 can include a media player 1218 that disclosed obtained and permissible content.

Figure 13:
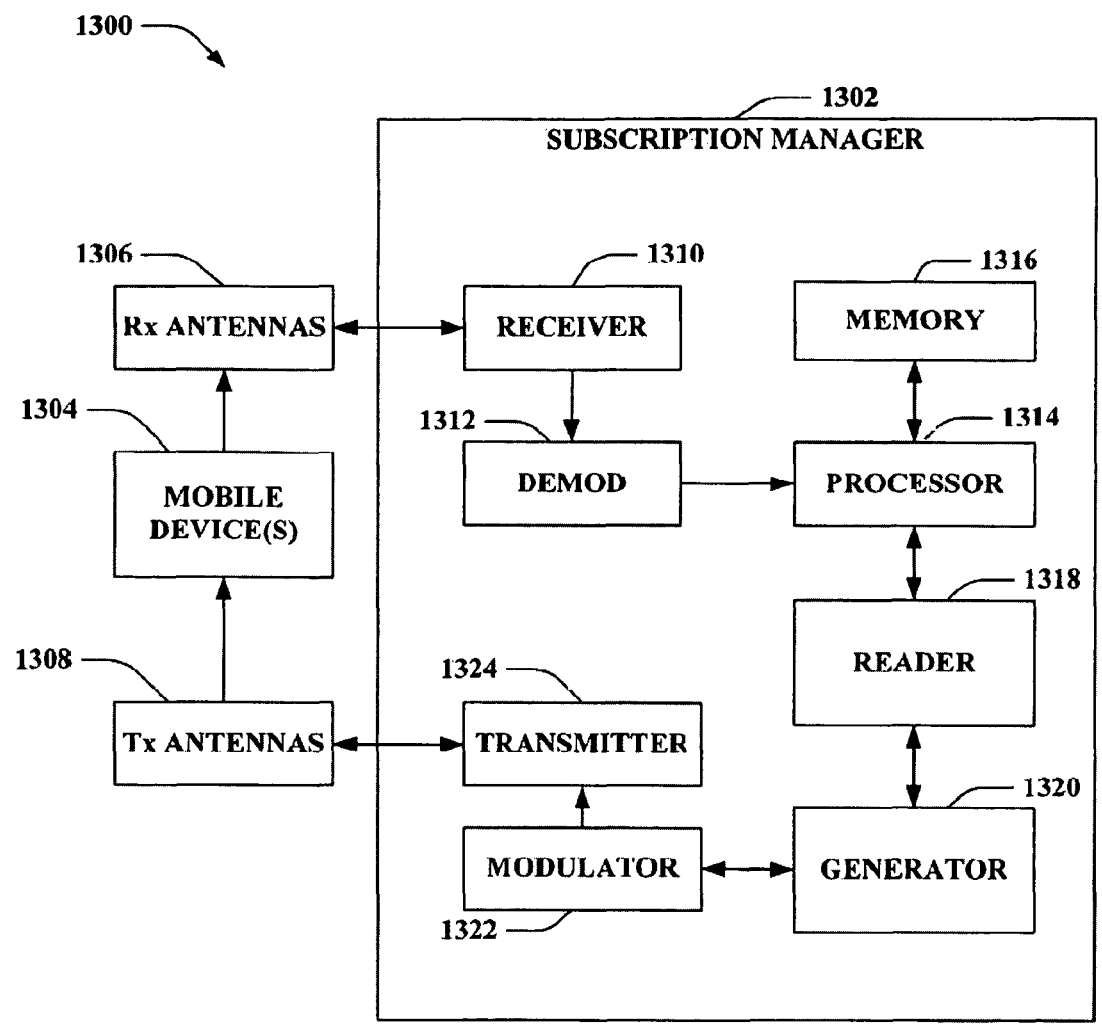
FIG. 13 is an illustration of an example system that facilitates programming a chip card with a threshold rating.

FIG. 13 is an illustration of a system 1300 that facilitates programming a chip card upon a mobile device. System 1300 comprises a subscription manager 1302 (e.g., access point, . . . ) with a receiver 1310 that receives signal(s) from one or more mobile devices 1304 through a plurality of receive antennas 1306, and a transmitter 1322 that transmits to the one or more mobile devices 1304 through a plurality of transmit antennas 1308. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein.

Processor 1314 can further couple to a reader 1318 that identifies a threshold rating that is to be implemented upon a chip card of a mobile device. Based upon the identified rating, a generator 1320 can produce command set information that instructs the mobile device how to program the chip card in accordance with the threshold. Modulator 1323 can multiplex the information for transmission by a transmitter 1324 through antenna 1308 to mobile device(s) 1304. Although depicted as being separate from the processor 1314, it is to be appreciated that receiver 1310, reader 1118, generator 1320 and/or modulator 1322 can be part of processor 1314 or a number of processors (not shown).

Figure 14:
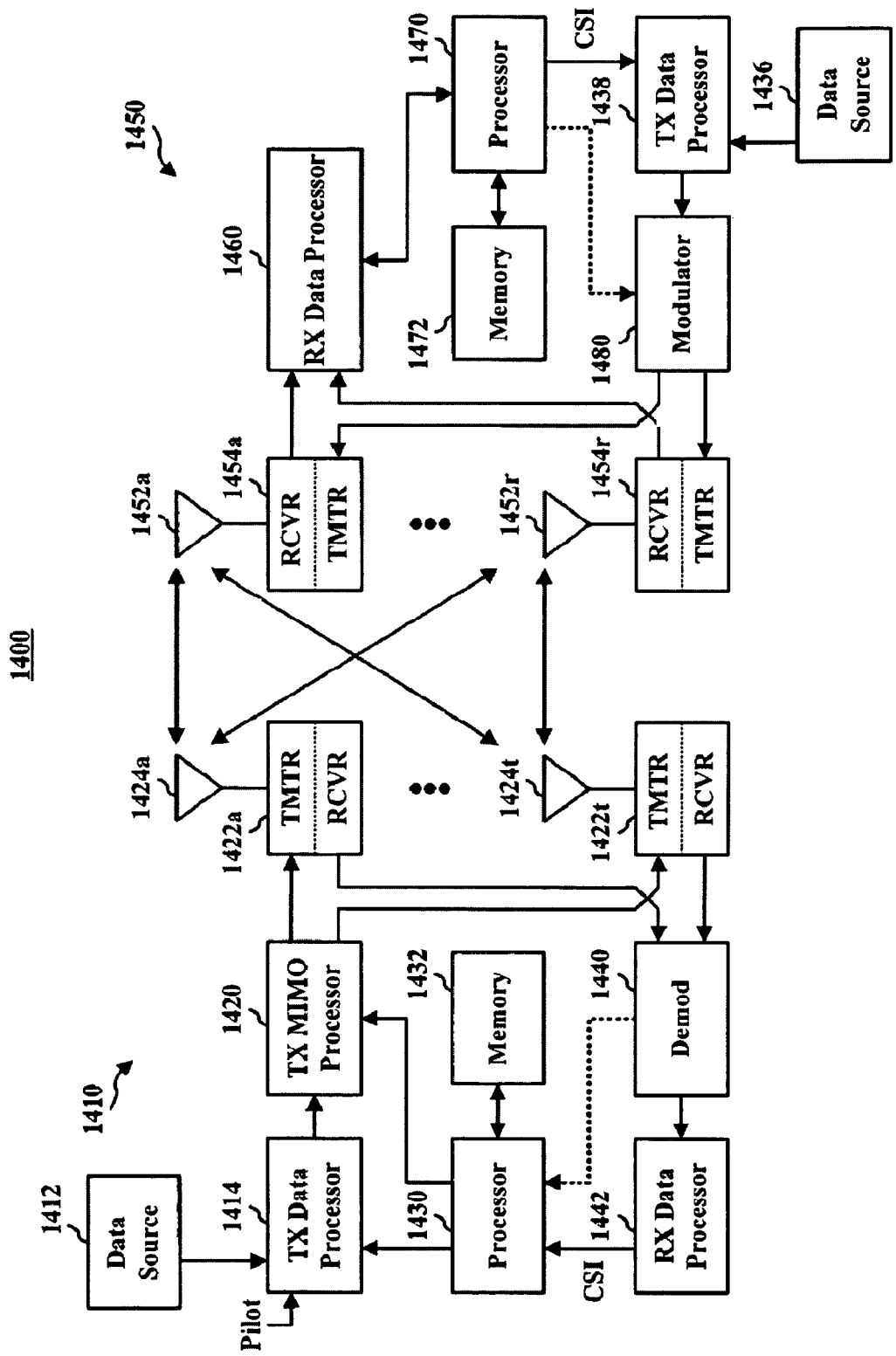
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-6 and 12-13) and/or methods (FIGS. 7-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which precoding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
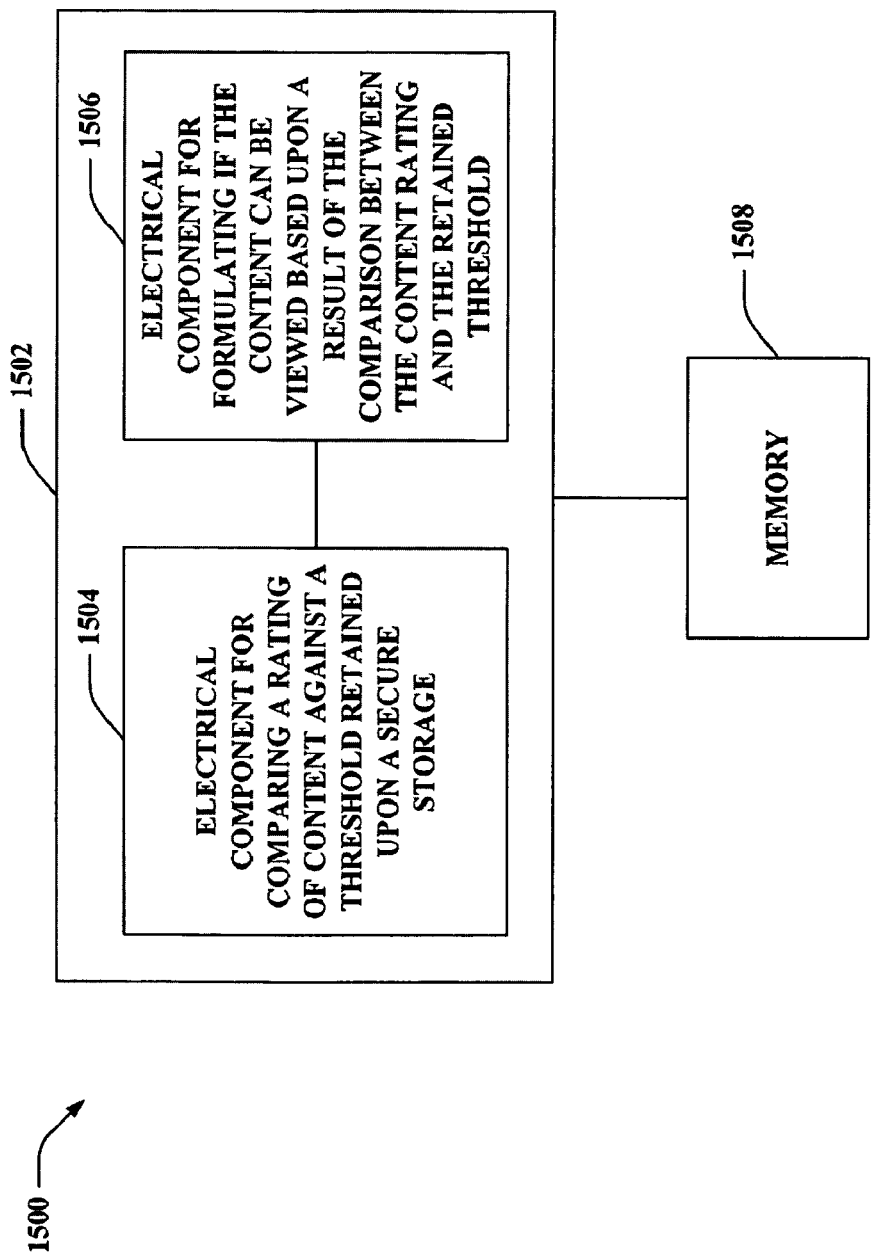
FIG. 15 is an illustration of an example system that facilitates determining if content should be viewed upon a mobile device.

With reference to FIG. 15, illustrated is a system 1500 that regulates content viewing upon a mobile device in accordance with rating comparisons. For example, system 1500 can reside at least partially within a mobile device. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction.

For instance, logical grouping can include an electrical component for comparing a rating of content against a threshold retained upon a secure storage 1504. Further, logical grouping 1502 can comprise an electrical component for formulating if the content can be viewed based upon a result of the comparison between the content rating and the retained threshold 1506. Additionally, system 1500 can include a memory 1508 that retains instructions for executing functions associated with electrical components 1504 and 1506. While shown as being external to memory 1508, it is to be understood that one or more of electrical components 1504 and 1506 can exist within memory 1508. The electrical component 1504 and/or electrical component 1506 can inherently include an electrical component for receiving the content from a service provider, an electrical component for receiving a command set for programming the secure storage concerning the threshold, an electrical component for programming the secure storage in accordance with the received command set, an electrical component for transmitting a form that includes the threshold, an electrical component for collecting the form, an electrical component for allowing the content to be viewed if the comparison is successful, an electrical component for denying the content to be viewed if the comparison is unsuccessful, or a combination thereof. However, it is to be appreciated that other configurations can be practiced, such as at least one of the inherent components implementing independently.

Figure 16:
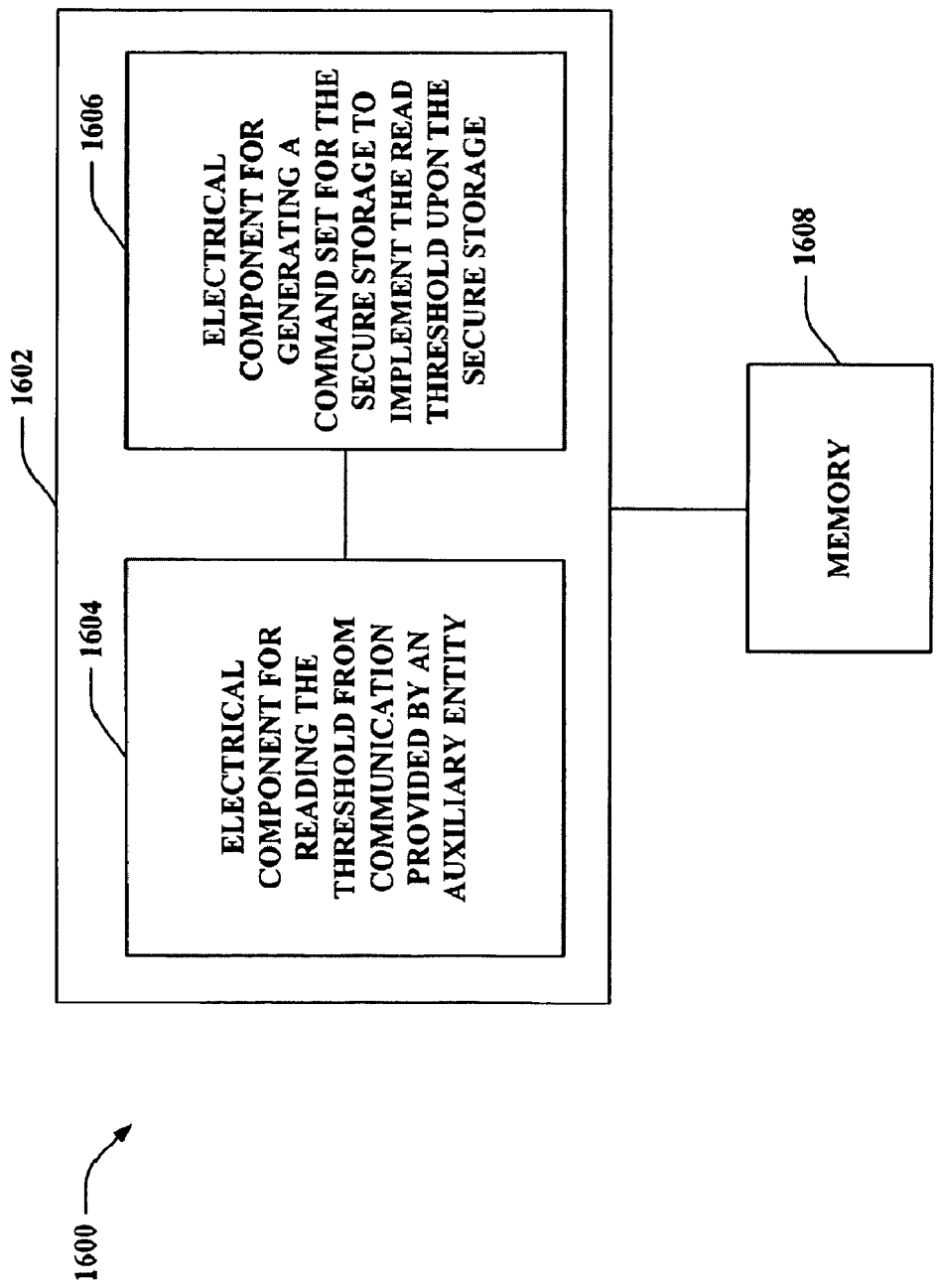
FIG. 16 is an illustration of an example system that facilitates generating a command set for programming a threshold voltage upon a chip card.

With reference to FIG. 16, illustrated is a system 1600 that facilitates programming of a secure storage to regulate content viewed upon a mobile device. For example, system 1600 can reside at least partially within a mobile device. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for reading the threshold from communication provided by an auxiliary entity 1604. Further, logical grouping 1602 can comprise an electrical component for means for generating a command set for the secure storage to implement the read threshold 1606, commonly the generated command set is used to program the threshold upon the secure storage. Additionally, system 1600 can include a memory 1608 that retains instructions for executing functions associated with electrical components 1604 and 1606. While shown as being external to memory 1608, it is to be understood that one or more of electrical components 1604 and 1606 can exist within memory 1608. The electrical component 1604 and/or electrical component 1606 can inherently include an electrical component for obtaining the communication from the auxiliary entity, an electrical component for determining a mobile device that is to have the secure storage programmed, an electrical component for sending the command set to the determined mobile device, or a combination thereof. However, it is to be appreciated that other configurations can be practiced, such as at least one of the inherent components implementing independently.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for managing content viewing upon a mobile device, the method comprising:
   receiving a command set at the mobile device;
   programming a secure storage of the mobile device with a threshold indicated by the command set, the secure storage being inaccessible for direct programming by a user of the mobile device;
   comparing a rating of video content against the threshold retained upon the secure storage; and
   formulating if the video content can be viewed, at the mobile device, based upon a result of the comparison between the content rating and the retained threshold.

2. The method of claim 1, further comprising receiving the video content at the mobile device from a service provider.

3. The method of claim 2, further comprising authenticating the video content.

4. The method of claim 1, further comprising transmitting a form, from the mobile device to a subscription manager, that includes the threshold, wherein the command set for programming is based upon the threshold included upon the form.

5. The method of claim 4, further comprising collecting the form at the mobile device from a service provider of the video content.

6. The method of claim 1, wherein formulating if the video content can be viewed at the mobile device comprises:
   allowing the video content to be viewed if the comparison is successful; or
   denying the video content from being viewed if the comparison is unsuccessful.

7. The method of claim 6, wherein a successful comparison is that the content rating is equal to or lesser than the threshold or a successful comparison is that the content rating is lesser than the threshold.

8. An apparatus that operates in a wireless communication system, the apparatus comprising:
   a receiver configured to receive a command set;
   a programmer configured to program a secure storage of the apparatus with a threshold indicated by the command set, the secure storage being inaccessible for direct programming by a user of the apparatus;
   at least one processor configured to:
      compare a rating of video content against a threshold retained upon secure storage; and
      formulate if the video content can be viewed, at the apparatus, based upon a result of the comparison between the content rating and the retained threshold; and
   a memory coupled to the at least one processor.

9. The apparatus of claim 8, further comprising a receiver configured to obtain the video content from a service provider.

10. The apparatus of claim 9, wherein the at least one processor is further configured to authenticate the video content.

11. The apparatus of claim 10, further comprising a transmitter configured to wirelessly convey a form that includes the threshold to a provider of the video content.

12. The apparatus of claim 11, further comprising a collector configured to gather the form.

13. The apparatus of claim 8, further comprising an implementer configured to allow the video content to be viewed if the comparison is successful or deny the video content from being viewed if the comparison is unsuccessful.

14. The apparatus of claim 13, wherein a successful comparison is that the content rating is equal to or lesser than the threshold or a successful comparison is that the content rating is lesser than the threshold.

15. A wireless communications apparatus that facilitates viewing remote video content on a mobile device, the apparatus comprising:
   means for receiving a command set at the mobile device;
   means for programming a secure storage of the mobile device with a threshold indicated by the command set, the secure storage being inaccessible for direct programming by a user of the mobile device;
   means for comparing a rating of video content against the threshold retained upon the secure storage; and
   means for formulating if the video content can be viewed based upon a result of the comparison between the content rating and the retained threshold.

16. The apparatus of claim 15, further comprising means for receiving the video content from a service provider.

17. The apparatus of claim 16, further comprising means for authenticating the content.

18. The apparatus of claim 15, further comprising means for transmitting a form, to a subscription manager, that includes the threshold.

19. The apparatus of claim 18, further comprising means for collecting the form.

20. The apparatus of claim 15, further comprising:
   means for allowing the video content to be viewed if the comparison is successful; or
   means for denying the video content from being viewed if the comparison is unsuccessful.

21. The apparatus of claim 20, wherein a successful comparison is that the content rating is equal to or lesser than the threshold or a successful comparison is that the content rating is lesser than the threshold.

22. A computer program product, comprising:
   a computer-readable medium comprising:
      code for receiving a command set at the mobile device;
      code for programming a secure storage of the mobile device with a threshold indicated by the command set, the secure storage being inaccessible for direct programming by a user of the mobile device;
      code for comparing a rating of video content against the threshold retained upon the secure storage; and
      code for formulating if the video content can be viewed based upon a result of the comparison between the content rating and the retained threshold.

23. The computer program product of claim 22, the computer-readable medium further comprising code for receiving the video content from a service provider.

24. The computer program product of claim 23, the computer-readable medium further comprising code for authenticating the video content.

25. The computer program product of claim 22, the computer-readable medium further comprising code for transmitting a form, to a subscription manager, that includes the threshold.

26. The computer program product of claim 25, the computer-readable medium further comprising code for collecting the form.

27. The computer program product of claim 22, the computer-readable medium further comprising code for:
allowing the video content to be viewed if the comparison is successful; or
denying the video content from being viewed if the comparison is unsuccessful.

28. The computer program product of claim 27, wherein a successful comparison is that the content rating is equal to or lesser than the threshold or a successful comparison is that the content rating is lesser than the threshold.

29. A method that facilitates programming upon secure storage of a mobile device a threshold to regulate video content viewing, the method comprising:
reading the threshold at a subscription manager from a communication provided by an auxiliary entity; and
generating a command set at the subscription manager for the secure storage to implement the threshold; and
sending the generated command set from the subscription manager to the mobile device to program the threshold upon the secure storage;
wherein the secure storage is inaccessible for direct programming by a user of the mobile device.

30. The method of claim 29, wherein the auxiliary entity is a video content service provider, and the secure storage is a universal integrated circuit card.

31. The method of claim 29, further comprising obtaining the communication from the auxiliary entity.

32. The method of claim 29, further comprising determining the mobile device that is to have the secure storage programmed.

33. An apparatus that operates in a wireless communication system, the apparatus comprising:
At least one processor configured to read a threshold from communication provided by an auxiliary entity, generate a command set for secure storage to implement the read threshold, and cause the generated command set to be sent to a mobile device to program the threshold upon the secure storage; and
a memory coupled to the at least one processor; wherein the secure storage is inaccessible for direct programming by a user of the mobile device.

34. The apparatus of claim 33, wherein the auxiliary entity is a content service provider, and the secure storage is a universal integrated circuit card.

35. The apparatus of claim 33, further comprising an obtainer that is configured to collect the communication from the auxiliary entity.

36. The apparatus of claim 33, further comprising a determiner that is configured to determine the mobile device that is to have the secure storage programmed.

37. The apparatus of claim 36, further comprising a sender that is configured to send the command set to the determined mobile device.

38. A wireless communications apparatus that facilitates programming upon secure storage of a mobile device a threshold to regulate content viewing, comprising:
means for reading the threshold from communication provided by an auxiliary entity;
means for generating a command set for the secure storage to implement the read threshold; and
means for causing the generated command set to be sent to the mobile device to program the threshold upon the secure storage;
wherein the secure storage is inaccessible for direct programming by a user of the mobile device.

39. The apparatus of claim 38, wherein the auxiliary entity is a content service provider, and the secure storage is a universal integrated circuit card.

40. The apparatus of claim 38, further comprising means for obtaining the communication from the auxiliary entity.

41. The apparatus of claim 38, further comprising means for determining the mobile device that is to have the secure storage programmed.

42. The apparatus of claim 41, further comprising means for sending the command set to the determined mobile device.

43. A computer program product, comprising:
a computer-readable medium comprising:
code for reading the threshold from communication provided by an auxiliary entity; and
code for generating a command set for the secure storage to implement the read threshold; and
code for causing the generated command set to be sent to a mobile wireless communication device to program the threshold upon the secure storage;
wherein the secure storage resides on the mobile device and is inaccessible for direct programming by a user of the mobile device.

44. The computer program product of claim 43, the auxiliary entity is a content service provider, and the secure storage is a universal integrated circuit card.

45. The computer program product of claim 43, the computer-readable medium further comprising code for obtaining the communication from the auxiliary entity.

46. The computer program product of claim 43, the computer-readable medium further comprising code for determining the mobile device that is to have the secure storage programmed.

* * * * *